US010174973B2

(12) United States Patent
Dmitriev et al.

(10) Patent No.: US 10,174,973 B2
(45) Date of Patent: Jan. 8, 2019

(54) MINIATURE LOW-VIBRATION ACTIVE COOLING SYSTEM WITH CONICAL ROTARY COMPRESSOR

(71) Applicant: VERT Rotors UK Limited, Edinburgh (GB)

(72) Inventors: Oleg Dmitriev, Edinburgh (GB); Evgenii Tabota, Moscow (RU)

(73) Assignee: VERT ROTORS UK LIMITED, Edinburgh, Scotland ( * ) Notice: Subject to any disclaimer, the term of this patent is extended or adjusted under 35 U.S.C. 154(b) by 0 days.

(21) Appl. No.: 15/684,596

(22) Filed: Aug. 23, 2017

(65) Prior Publication Data
US 2017/0356678 A1 Dec. 14, 2017

Related U.S. Application Data

(63) Continuation-in-part of application No. 14/837,736, filed on Aug. 27, 2015, now Pat. No. 9,776,739.

(51) Int. Cl.
*F25B 39/04* (2006.01)
*F25B 9/00* (2006.01)
(Continued)

(52) U.S. Cl.
CPC ............ *F25B 9/002* (2013.01); *F04C 18/082* (2013.01); *F04C 18/107* (2013.01); *F25B 1/047* (2013.01);
(Continued)

(58) Field of Classification Search
CPC .......... F25B 1/047; F25B 9/002; F25B 9/006; F25B 31/002; F25B 31/026; F25B 39/00;
(Continued)

(56) References Cited

U.S. PATENT DOCUMENTS 1,892,217 A   4/1931   Moineau
2,085,115 A   4/1935   Moineau
(Continued)

FOREIGN PATENT DOCUMENTS

WO   WO/2008/000505 A1   1/2008
WO   WO/2008/000506 A1   1/2008
(Continued)

OTHER PUBLICATIONS

J.R. Olson et al., "Microcryocooler for tactical and space applications," AIP Conference Proceedings, 2014, pp. 357-364.
(Continued)

*Primary Examiner* — Melvin Jones
(74) *Attorney, Agent, or Firm* — Law Offices of Damon L. Boyd, PLLC

(57) ABSTRACT

A system for cryocooling an optical sensor on a satellite to a temperature below 200K with minimal vibration comprising a miniature conical rotary screw compressor comprising an inner element configured to only rotate around a first stationary axis and an outer element configured to only rotate around a second stationary axis so that both elements revolve with minimal vibration; with at least one of a) a length of at least one of the inner element and the outer element is between 10 mm and 100 mm; b) a diameter of at least one of the inner element and the outer element is between 2 mm and 45 mm; c) a compression ratio of the rotary screw compressor is between 1:2 and 1:20; and d) a shaft speed of the conical rotary screw compressor is between 1001 and 20000 revolutions per minute.

16 Claims, 7 Drawing Sheets

(51) Int. Cl.
*F25B 31/02* (2006.01)
*F25B 39/00* (2006.01)
*F25B 31/00* (2006.01)
*F04C 18/107* (2006.01)
*F04C 18/08* (2006.01)
*F25B 1/047* (2006.01)
*B64G 1/58* (2006.01)
*F04C 18/16* (2006.01)

(52) U.S. Cl.
CPC ............ *F25B 9/006* (2013.01); *F25B 31/002* (2013.01); *F25B 31/026* (2013.01); *F25B 39/00* (2013.01); *B64G 1/58* (2013.01); *F04C 18/16* (2013.01); *F04C 2210/26* (2013.01); *F04C 2250/201* (2013.01); *F25B 39/04* (2013.01); *F25B 2500/01* (2013.01); *F25B 2500/13* (2013.01)

(58) Field of Classification Search
CPC .......................... F25B 39/04; F25B 2500/201; F25B 2500/13; F25B 2500/01; F04C 18/107; F04C 18/082; F04C 18/16; F04C 2250/201; B64G 1/58
See application file for complete search history.

(56) References Cited

U.S. PATENT DOCUMENTS

| | | | |
|---|---|---|---|
| 2,615,436 A | 11/1950 | Pawl | |
| 2,733,854 A | 3/1952 | Chang | |
| 2,765,114 A | 6/1953 | Chang | |
| 2,871,793 A | 6/1956 | Michie | |
| 3,116,871 A | 1/1964 | Mishina | |
| 3,479,960 A | 11/1969 | Cardoso | |
| 3,822,972 A * | 7/1974 | Ogly | E21B 4/02 418/48 |
| 4,424,013 A * | 1/1984 | Bauman | F01C 1/107 123/242 |
| 4,479,358 A | 10/1984 | Lam | |
| 4,802,827 A * | 2/1989 | Fujiwara | F04C 18/1075 417/356 |
| 4,863,357 A | 9/1989 | Olofsson | |
| 5,195,882 A | 3/1993 | Freeman | |
| 6,755,626 B2 | 6/2004 | Komatsu | |
| 7,530,217 B2 | 5/2009 | Murrow | |
| 8,083,508 B2 * | 12/2011 | Irving | F04C 18/1075 418/15 |
| 8,152,499 B2 | 4/2012 | Brun | |
| 8,308,459 B2 | 11/2012 | Grann | |
| 9,776,739 B2 | 10/2017 | Dmitriev | |
| 2007/0264147 A1 | 11/2007 | Gorban | |

FOREIGN PATENT DOCUMENTS

| | | |
|---|---|---|
| WO | WO/2008/135116 A1 | 11/2008 |
| WO | WO/2015/124918 A1 | 8/2015 |

OTHER PUBLICATIONS

International Search Report and Written Opinion dated Jun. 26, 2015 for Int'l Application No. PCT/GB2015/050459 (WO/2015/124918).
Ex Parte Quayle Action dated Apr. 7, 2017 from U.S. Appl. No. 14/837,736.
Apr. 11, 2017 Response to Ex Parte Quayle Action dated Apr. 7, 2017 from U.S. Appl. No. 14/837,736.
Notice of Allowance dated Jun. 6, 2017 from U.S. Appl. No. 14/837,736.
Issue Fee Payment receipt dated Aug. 24, 207 from U.S. Appl. No. 14/837,736.
Issue Notification dated Sep. 13, 2017 from U.S. Appl. No. 14/837,736.
Information Disclosure Statement by Applicant dated Sep. 2, 2015 from U.S. Appl. No. 14/837,736.

* cited by examiner

MINIATURE LOW-VIBRATION ACTIVE COOLING SYSTEM WITH CONICAL ROTARY COMPRESSOR

CROSS-REFERENCE TO RELATED APPLICATIONS

This application is a continuation-in-part patent application of U.S. application Ser. No. 14/837,736 entitled "Miniature Low-Vibration Active Cooling System with Conical Rotary Compressor," filed on Aug. 27, 2015, which is incorporated herein by reference.

FIELD

The present disclosure relates to the use of a miniature active cryocooling system for use on a satellite, the cryocooling system comprising a miniature conical rotary compressor with a high compression ratio and which operates with minimal vibration.

BACKGROUND

Heat removal and temperature control has become a highly important issue with CubeSats (100 mm×100 mm×100 mm–scale) and small satellite platforms (1 m×1 m×1 m–scale). A significant use of such satellites includes Earth observation using optical sensors. With increasing power budgets on CubeSats, increasing radio power requirements, and higher data rates, optical sensors experience more heat, Signal-to-noise ratio (SNR) decreases, and the quality of observation is reduced. Thus, efficient cooling systems for satellite optical sensors are required. The tasks for such a system include moving tens of watts away from a heat source and cooling to cryogenic temperatures below 123K (−150° C. or −238° F.) in order to enhance the SNR of the optical sensors. Excess heat may be radiated into Space by radiation from black panels according to Stefan-Boltzmann law. However, prior art cooling systems encounter several technical problems include size constraints and vibration issues, and lack necessary efficiencies.

A first technical problem of creating a miniature cryocooling system for small satellites is that it must be very small. That is, they must be less than about 100 mm long and have a height of less than about 40 mm, in order to fit into 100 mm frame of a CubeSat.

A second technical problem is that compressors in such miniature cooling system must produce as little vibration as possible, because vibration distorts the image of the optical sensors on small satellites.

A third technical problem is that the miniature cooling system must be very efficient, and not use more energy than it removes, because very little energy (e.g., from solar panels) is available for the cooling systems of small satellites, and as much of the available energy as possible is required to perform other useful functions of the satellite.

A traditional approach for cooling systems for satellites is passive cooling. Passive cooling systems consisting of heat sinks have proven to be effective in a range of approximately 258 K to 313 K for sun synchronous orbits. More sophisticated passive cooling systems with ethane circulation between the cold and hot radiators such as the thermal control system designed for the PRISMA satellite of Agenzia Spaziale Italiana is capable of removing about 4.8 W of heat and cooling to around 185K (−88° C. or −127° F.). However, the temperature of 185K is above the cryocooling range (e.g. below 123K), and therefore does not meet the requirement.

Thus, active systems with a compressor can be significantly more effective, because the compressor heats the refrigerant through compression and enhances radiation of heat through black panels. Specifically, the Stefan-Boltzmann law states that while the total energy radiated per unit surface area of a black body is linearly dependent on the surface area of the radiating panels, it depends on the fourth power of the black panels' thermodynamic temperature T. For example, an active system developed by Lockheed Martin demonstrated removal of 0.65 W and cooling to 150K, but nonetheless, still does not reach the cryocooling range of below 123K and does not remove the tens of watts needed for cryocooling, and therefore does not meet the noted requirements.

Active cryocooling systems such as those based on reciprocating compressors or Stirling engines do come closer to or meet cryocooling ranges, but they also produce too much vibration due to two pistons constantly moving in reciprocating motion, and because of this, such systems do not meet the noted requirements. An example of such a miniature cryogenic cooling system is disclosed in U.S. Pat. No. 4,479,358.

Other prior art such as Joule-Thomson cryocoolers are too large and heavy for small satellites. Examples of these include the 4.3 kg Oxford cryocooler employed on UARS. These systems do not meet the noted requirements.

Miniature twin-screw or turbo compressors can solve the technical problem of vibration because they operate with rotary motion and produce minimal vibration. But it is well-known that in miniature sizes, with lengths shorter than 100 mm and heights lower than 40 mm, oil-free twin-screw and turbo compressors do not provide high compression ratios over 1:1.5, and therefore the temperature of refrigerant does not significantly increase through compression. Thus, very little heat is transferred to black radiation panels and radiated into space. For this reason twin-screw or turbo compressors do not meet the noted requirements.

As such, there is a need for a miniature rotary compressor in an active cooling system for use on a satellite that operates with minimal vibration, provides high compression ratio of 1:2 to 1:20, elevates the temperature of a refrigerant fluid in order to effectively radiate excess energy into Space according to Stefan-Boltzmann law, and enables removing tens of watts away from a heat source and cooling to cryogenic temperatures below 123K (−150° C. or −238° F.).

SUMMARY

In accordance with various aspects of the present disclosure, there is provided a miniature active system for cryocooling of small satellites, comprising a miniature conical screw rotary compressor operating with minimal vibration, a condenser in communication with black radiation panels, an evaporator, and charged with refrigerant appropriate for use in space. A length of the conical rotary screw compressor may be between 10 mm and 100 mm. A diameter of each of the screw elements in the conical rotary screw compressor may be between 2 mm and 45 mm, so that there is space for housing parts to keep within the height of 40 mm. A compression ratio of the rotary screw compressor may be between 1:2 and 1:20, so that the temperature of refrigerant is significantly elevated during compression. A shaft speed of the rotary screw compressor may be between 6001 and 20000 revolutions per minute.

In accordance with various aspects of the present disclosure, a method of cooling an object, comprises using a cooling system to cool the object, the cooling system comprising the steps of: removing heat from at least one component of the object into an evaporator, thereby heating a refrigerant in an evaporator; passing a refrigerant from the evaporator into a conical rotary screw compressor, wherein the rotary screw compressor includes an inner element and an outer element; a motor; a condenser; an expander; and the evaporator; compressing the refrigerant in the conical rotary screw compressor, thereby heating the refrigerant; passing heated refrigerant from the conical rotary screw compressor to the condenser; passing heat from the condenser into at least one cooling panel; and radiating heat from the at least one cooling panel. In accordance with various embodiments using the method include at least one of: a) a length of the conical rotary screw compressor is between 10 mm and 100 mm; b) a diameter of each of the screw elements of the conical rotary screw compressor is between 2 mm and 45 mm; c) a compression ratio of the conical rotary screw compressor is between 1:2 and 1:20; and d) a shaft speed of the conical rotary screw compressor is between 6001 and 20000 revolutions per minute;

Any aspect of the present disclosure may be applied to other aspects of the disclosure, in any appropriate combination. For example, apparatus features may be applied to method features and vice versa.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein like numerals denote like elements and wherein.

DETAILED DESCRIPTION OF THE ILLUSTRATED EMBODIMENTS

Figure 1:
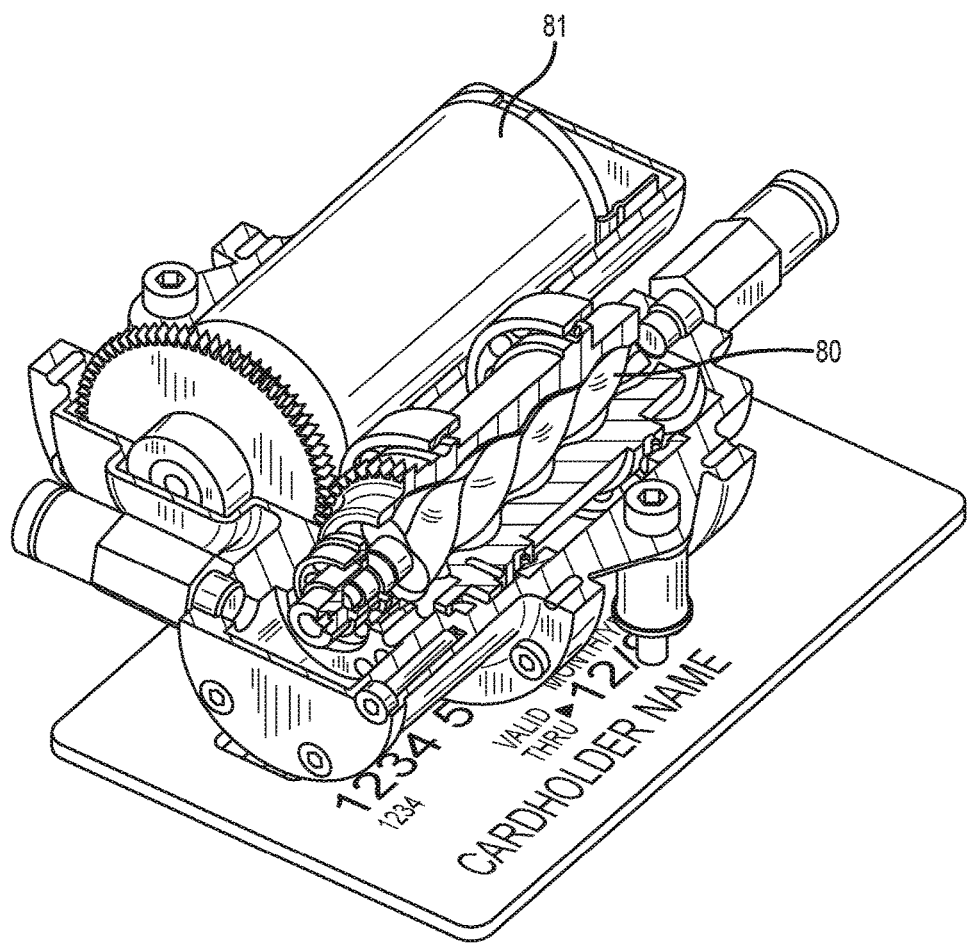
FIG. 1 shows a comparison of the miniature rotary conical compressor for satellite cooling with a credit card.

Persons skilled in the art will readily appreciate that various aspects of the present disclosure can be realized by any number of methods and systems configured to perform the intended functions. Stated differently, other methods and systems can be incorporated herein to perform the intended functions. It should be noted that the accompanying drawing figures referred to herein are not all drawn to scale, but can be exaggerated to illustrate various aspects of the present disclosure, and in that regard, the drawing figures should not be construed as limiting.

Figure 2:
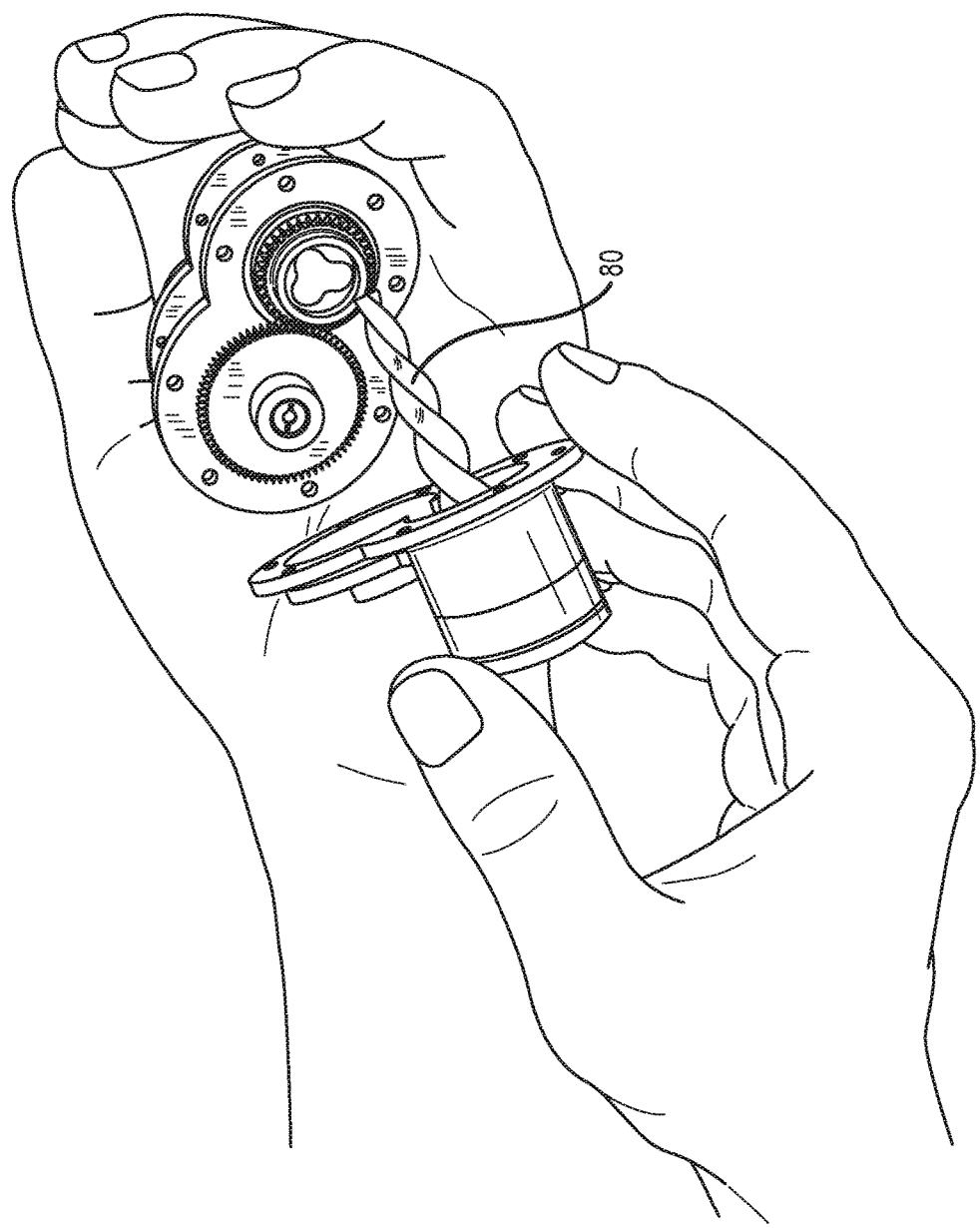
FIG. 2 shows a miniature conical rotary compressor for satellite cooling held in an adult human hand.

In accordance with various aspects of the present disclosure, a miniature rotary compressor for use in an active cooling system for objects such as CubeSat satellites is provided. The use of a miniaturized rotary compressor can provide for a high compression ratio with low associated vibrational effects, and may provide for significantly improved cooling or cooling efficiency. FIGS. 1 and 2 illustrate a comparison of a miniature rotary conical compressor for satellite cooling with a credit card and in an adult human hand. In accordance with various aspects of the present disclosure, a miniature rotary compressor operates with minimal vibration, provides high compression ratio of 1:2 to 1:20, elevates the temperature of a refrigerant fluid in order to effectively radiate excess energy into Space according to Stefan-Boltzmann law, and enables removing tens of watts away from a heat source and cooling to cryogenic temperatures below 123K (−150° C. or −238° F.).

Figure 3:
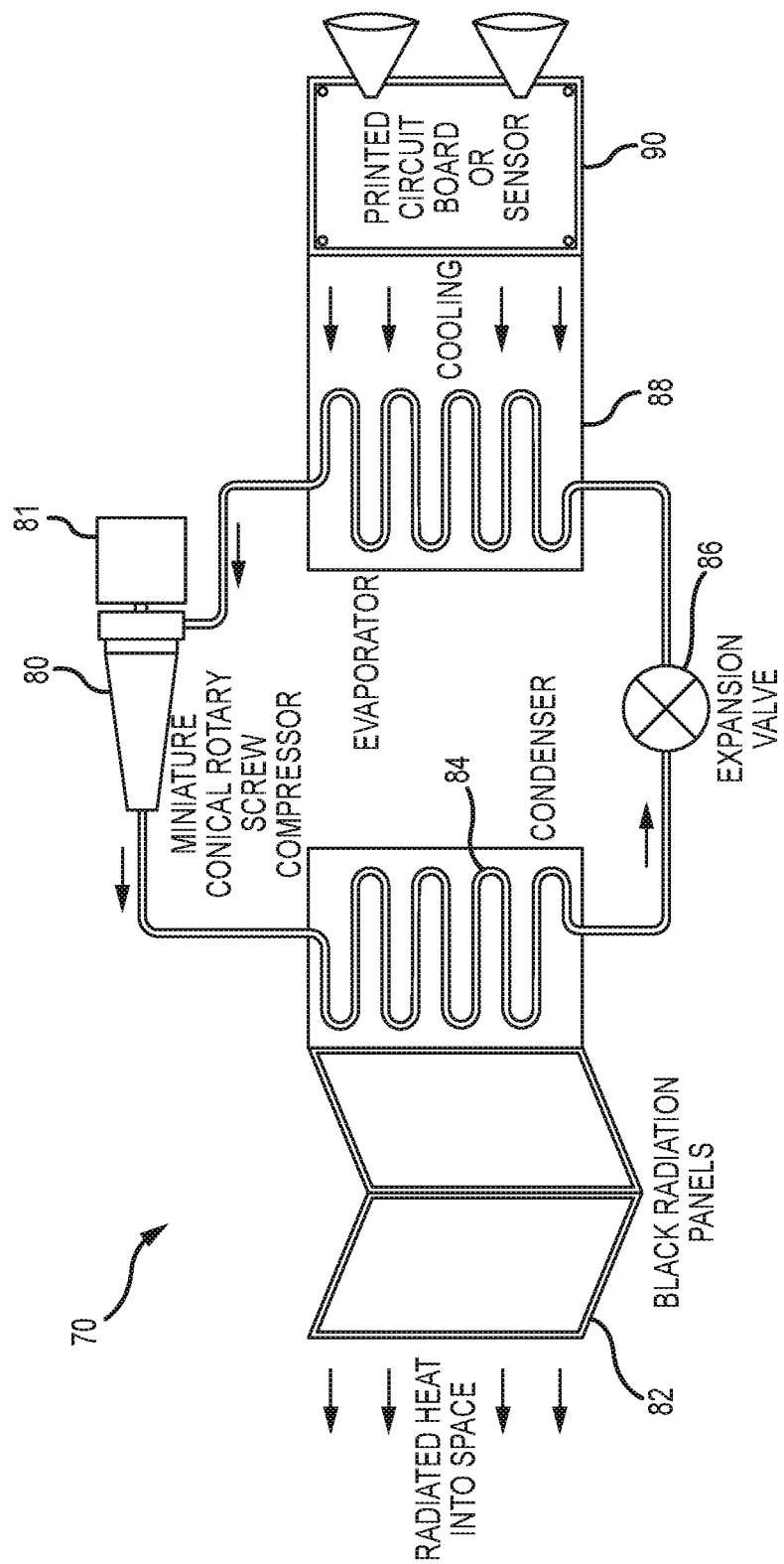
FIG. 3 is a cooling system for satellite equipment based on the conical rotary compressor.

In accordance with various aspects of the present disclosure, an active cryocooling system to cool the objects of a satellite is provided. With reference now to FIG. 3, a cooling system 70 in accordance with the present disclosure may comprise a miniature conical rotary screw compressor 80, a motor 81, a condenser 84, an expander 86 and an evaporator 88. An exemplary conical rotary screw compressor and various components thereof are disclosed in PCT Patent Application No. PCT/GB/2015/050459, which is hereby incorporated by reference. Additionally, with reference now to FIGS. 2 and 3, a miniature rotary screw compressor 80 comprises an inner element 91 and an outer element 92. In accordance with various aspects of the present disclosure, a length of at least one of the inner element 91 and the outer element 92 may be between about 10 mm and about 100 mm and a diameter of at least one of the inner element 91 and the outer element 92 may be between about 2 mm and about 45 mm. Additionally, in accordance with various aspects, a compression ratio of the rotary screw compressor 80 may be between about 1:2 and about 1:20. A shaft speed of the rotary screw compressor 80 may be between about 1001 and about 20000 revolutions per minute. In various embodiments, the object being cooled may comprise a satellite.

In accordance with various aspects of the present disclosure, the cooling system may be used to cool an object and may comprise removing heat from at least one component of the object into the evaporator 88, thereby heating a refrigerant in the evaporator; passing refrigerant from the evaporator 88 into the conical rotary screw compressor 80; compressing the refrigerant in the conical rotary screw compressor 80, thereby heating the refrigerant; passing heated refrigerant from the conical rotary screw compressor 80 to the condenser 84; passing heat from the condenser 84 into at least one cooling panel 82; and radiating heat from the at least one cooling panel 82. In accordance with various embodiments, the at least one component of the object may comprise at least one sensor 90. Radiating heat from the at least one cooling panel 82 may comprise radiating the heat into space from the at least one cooling panel 82.

Cooling systems in accordance with the present disclosure such as those shown in FIGS. 1-6 may provide a method of cooling a sensor that may meet the demanding constraints required of a cooling system for a satellite. By using a miniaturized rotary screw compressor (i.e., those having the dimensions noted above), vibration may be reduced and thus, to achieve acceptable performance of image sensors, it may be necessary to cool the sensors to an appropriate temperature without compromising the performance of the sensors by introducing an unacceptable level of vibration. Thus, cooling systems using a miniaturized rotary screw compressor may in some cases be particularly appropriate for cooling a system that requires low vibration, and may in addition be small enough that it may be incorporated in a small satellite such as a CubeSat or other nanosatellite. Some embodiments of the miniaturized rotary screw compressor may also be able to provide higher compression ratios than could previously be provided by some compressors of comparable size, allowing the cooling system to provide effective cooling even in a very small system.

In accordance with various embodiments of the present disclosure, cooling systems such as those disclosed herein may provide an active cooling system elevating the temperature of gas through compression and enhancing radiation of heat through black panels. In other embodiments, different cooling panels may be used, or another method of removing heat from the condenser may be used. In the presently described embodiment, the cooling system cools the printed circuit board or sensor 90, though in alternative embodiments, the cooling system may cool different satellite components.

The use of the miniaturized rotary screw compressor in the cooling system can provide for a high compression ratio with low associated vibrational effects, and may provide for significantly improved cooling or cooling efficiency. In various embodiments and as illustrated in FIG. 3, the cooling system may be configured to heat a refrigerant during compression and to cool the refrigerant through radiation of energy through cooling panels 82. The cooling panels 82 may comprise black radiation panels.

Figure 4:
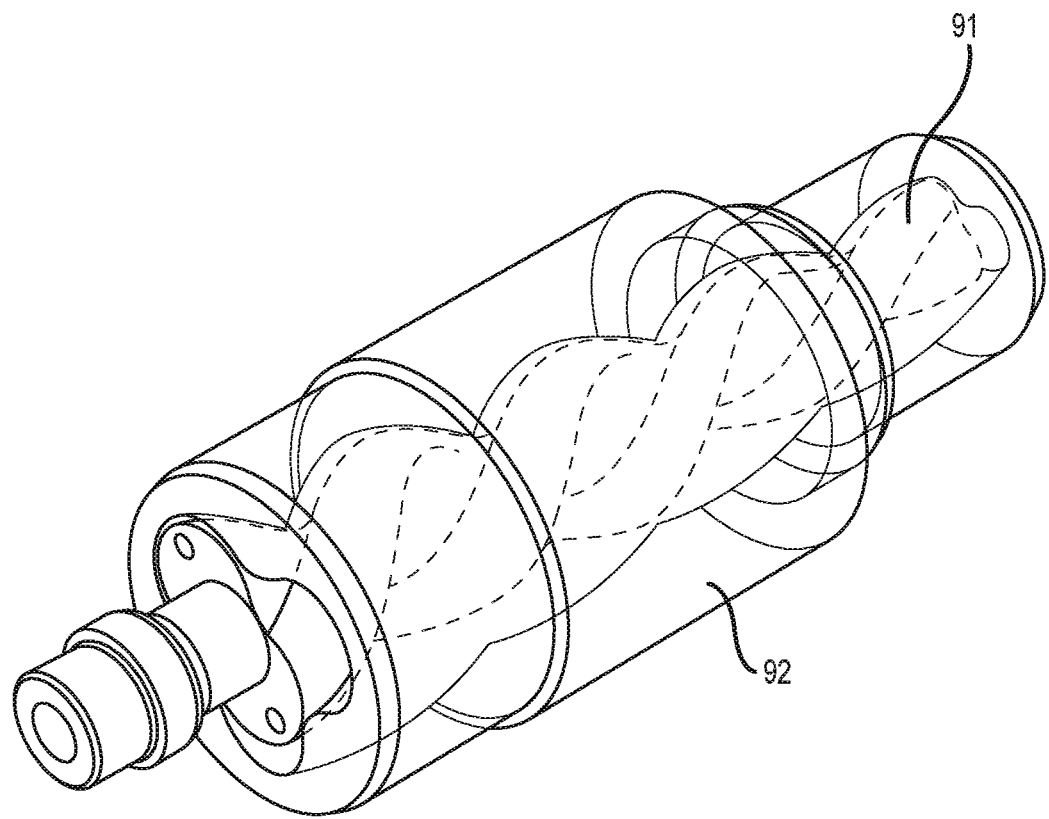
FIG. 4 shows a CAD model of the inner conical screw rotor and the outer conical screw rotor of the conical rotary compressor.
Figure 5:
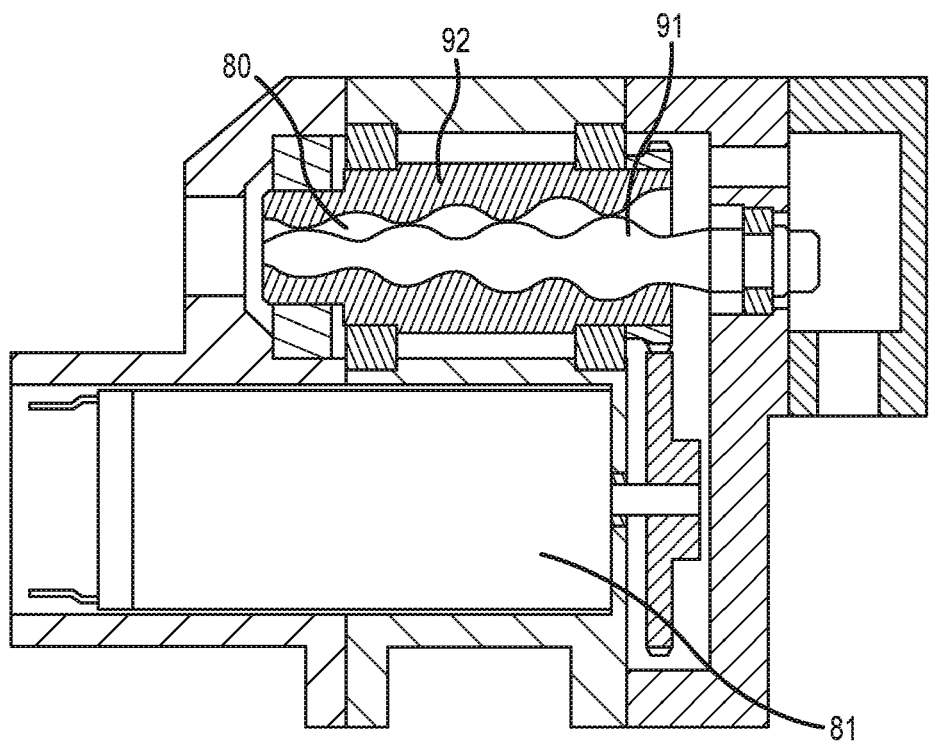
FIG. 5 is schematic diagram of a conical rotary compressor.
Figure 6:
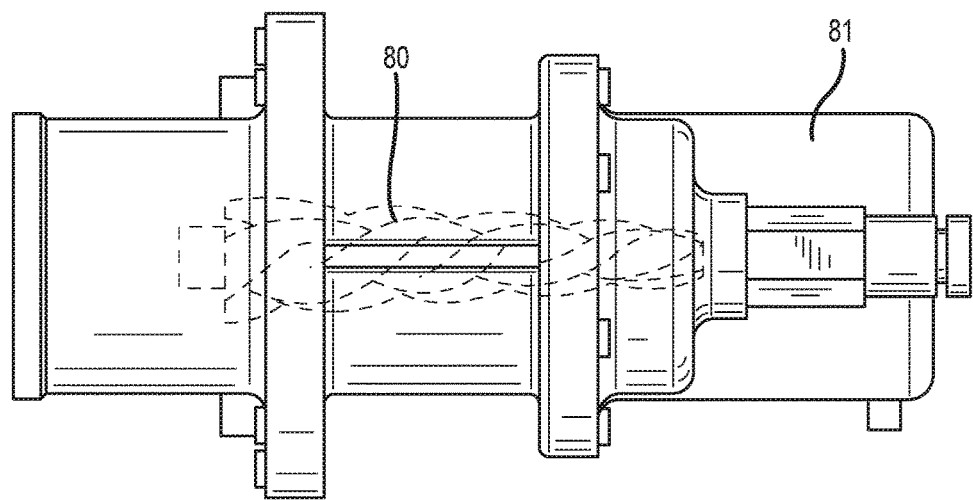
FIG. 6 shows a top view of a conical rotary compressor.

With reference now to FIGS. 4-6, the inner element 91 and the outer element 92 of the conical rotary screw compressor may each revolve around a respective stationary axis, which may be described as a static or fixed axis. Each axis may remain stationary in operation. Neither of the elements may perform eccentric motion thereby reducing vibrations to the minimum.

As mentioned above, in various embodiments, the conical rotary screw compressor may be configured to compress the refrigerant, thereby heating the refrigerant. The refrigerant may comprise any of helium, krypton, methane, or a mixture thereof.

In various embodiments and with continued reference to FIGS. 4-6, a length of at least one of the inner element 91 and the outer element 92 may be between about 10 mm and about 100 mm, optionally between about 10 mm and about 50 mm, further optionally between about 30 mm and about 50 mm.

A diameter of at least one of the inner element 91 and the outer element 92 may be between about 2 mm and about 45 mm, optionally between about 2 mm and about 20 mm. A diameter of at least one of the inner element 91 and the outer element 92 may be less than about 45 mm, optionally less than about 20 mm, further optionally less than about 18 mm, further optionally less than about 15 mm.

A mass of the rotary screw compressor 80 may be less than about 100 g (excluding the motor). A small compressor is suitable for use in space, due to its small footprint and low mass. The cost of delivering the cooling system into space is be dependent on its size and/or mass.

A compression ratio of the conical rotary screw compressor 80 may be between about 1:2 and about 1:20. The compression ratio of the rotary screw compressor 80 may be at least 1:1.5, optionally at least 1:2, further optionally at least 1:5. The compression ratio may be greater than that of some existing small compressors. A higher compression ratio may result in greater heat removal.

A shaft speed of the conical rotary screw compressor 80 may be between about 1001 and about 20000 revolutions per minute. The shaft speed of the rotary screw compressor 80 may be greater than 1001 revolutions per minutes, optionally greater than 8000 revolutions per minute, further optionally greater than 12000 revolutions per minute, further optionally greater than 15000 revolutions per minute. The relative rotational speed of the inner element 91 and the outer element 92 may be less than the shaft speed.

The cooling system may be configured to support removal of between about 5 W and about 20 W of heat. The cooling system may be configured to support removal of between about 5 W and about 50 W of heat. The cooling system may be configured to support removal of at least 5 W of heat, optionally at least 20 W, further optionally at least 30 W.

The conical rotary screw compressor 80 may be configured for oil-free operation. Alternatively, oil may be used for lubrication and/or cooling of the conical rotary screw compressor 80.

In other embodiments, a different compressor design may be used. At least one of the inner element 91 and the outer element 92 may have a length between about 10 mm and about 100 mm. The diameter of at least one of the inner element 91 and the outer element 92 may be between about 2 mm and about 45 mm. The compression ratio may be between about 1:2 and about 1:20. The shaft speed may be between about 1001 and about 20000 r/min.

The shape of the inner element 91 and outer element 92 of the rotary screw compressor may be determined, for example as part of a design or manufacturing process, using a method such as that disclosed in PCT Application PCT/GB2013/051497, which is hereby incorporated by reference.

Figure 7:
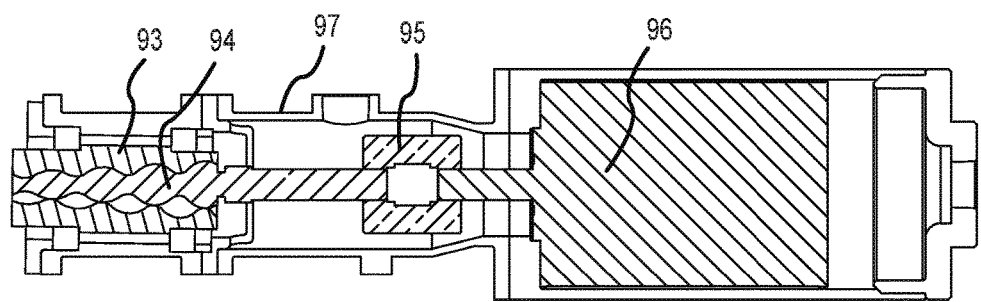
FIG. 7 shows a rotary screw compressor directly driven by an electric motor connected through a coupling.

The rotary screw compressor can be driven by an electric motor through a gear train or a belt or a chain, such as shown on drawings FIG. 1, FIG. 2, or FIG. 5, or directly driven by an electric motor connected through a coupling, as shown on FIG. 7. With specific reference to FIG. 7, a miniature rotary screw compressor 97 is illustrated comprising an inner element 94, and an outer element 93, and a motor 96, wherein the motor 96 and the inner element 94 are connected by a coupling 95.

Finally, it will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

We claim:

1. An active cryocooling system for cooling sensors in a satellite to a temperature below 200K with minimal vibration comprising:
    a miniature conical rotary screw compressor comprising an inner element configured to rotate around a first stationary axis and an outer element configured to rotate around a second stationary axis so that the axes are inclined to each other and both elements revolve with minimal vibration;

a condenser in communication with black radiation panels;

an expansion device;

an evaporator connected with sensors;

a refrigerant; and wherein:
- a) a length of at least one of the inner element and the outer element of the rotary screw compressor is between 10 mm and 100 mm;
- b) a diameter of at least one of the inner element and the outer element of the rotary screw compressor is between 2 mm and 45 mm;
- c) a compression ratio of the rotary screw compressor is between 1:2 and 1:20; and
- d) a shaft speed of the rotary screw compressor is between 1001 and 20000 revolutions per minute; and
- e) the refrigerant comprises at least one of helium, krypton, methane, and a mixture thereof.

2. An active cryocooling system according to claim 1, wherein the active cryocooling system is for removing heat from at least one of a satellite, a printed circuit board, and a sensor.

3. An active cryocooling system according to claim 1, wherein the active cryocooling system is configured to heat the refrigerant during compression and to cool the refrigerant through radiation of energy through the black radiation panels.

4. An active cryocooling system according to claim 1, wherein a mass of the conical rotary screw compressor is less than 100 g.

5. An active cryocooling system according to claim 1, wherein a compression ratio of the conical rotary screw compressor is at least one of: at least 1:3 and at least 1:5.

6. An active cryocooling system according to claim 1, wherein the active cryocooling system is configured to support removal of between 5 W and 20 W of heat.

7. An active cryocooling system according to claim 1, wherein the conical rotary screw compressor is configured for oil-free operation.

8. An active cryocooling system according to claim 1, wherein oil is used for lubrication or cooling of the conical rotary screw compressor.

9. A method for cooling sensors in a satellite with minimal vibration, comprising the steps of:

removing heat from at least one component of the satellite into an evaporator, thereby heating a refrigerant in the evaporator;

passing a refrigerant from the evaporator into a miniature conical rotary screw compressor;

compressing the refrigerant in the miniature conical rotary compressor with minimal vibration, thereby elevating the temperature of the refrigerant;

passing heated refrigerant from the miniature conical rotary screw compressor to the condenser;

passing heat from the condenser into at least one cooling panel; and radiating heat from the at least one cooling panel;

and wherein:
- a) a length of at least one of an inner element and an outer element of the miniature conical rotary screw compressor is between 10 mm and 100 mm;
- b) a diameter of at least one of the inner element and the outer element of the miniature conical rotary screw compressor is between 2 mm and 45 mm;
- c) a compression ratio of the miniature conical rotary screw compressor is between 1:2 and 1:20; and
- d) a shaft speed of the miniature conical rotary screw compressor is between 1001 and 20000 revolutions per minute.

10. A method according to claim 9, wherein the method for cooling the sensors is configured to heat the refrigerant during compression and to cool the refrigerant through radiation of energy through cooling panels.

11. A method according to claim 9, wherein the refrigerant comprises at least one of helium, krypton, methane, and a mixture thereof.

12. A method according to claim 9, wherein a mass of the miniature conical rotary screw compressor is less than 100 g.

13. A method according to claim 9, wherein a compression ratio of the miniature conical rotary screw compressor is at least one of between 1:2 and 1:20; at least 1:3, and at least 1:5.

14. A method according to claim 9, wherein the method for cooling the sensors is removes between 5 W and 20 W of heat.

15. A method according to claim 9, wherein the conical rotary screw compressor is configured for oil-free operation.

16. A method according to claim 9, wherein oil is used for at least one of lubrication and cooling of the miniature conical rotary screw compressor.

* * * * *